(12) United States Patent
Shukla et al.

(10) Patent No.: US 11,368,377 B2
(45) Date of Patent: Jun. 21, 2022

(54) CLOSED LOOP MONITORING BASED PRIVILEGED ACCESS CONTROL

(71) Applicant: ACCENTURE GLOBAL SOLUTIONS LIMITED, Dublin (IE)

(72) Inventors: Sanjeev Shukla, Croydon (GB); Gaurav Tandon, Wokingham (GB); Chetan Kulshrestha, Pune (IN); Alok Panda, Wokingham (GB); Sayon Roy Choudhury, Ghaziabad (IN); Anil Vilas Renuse, Pune (IN); Catherine Marie-Luise Ploehn, Duesseldorf (DE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 23 days.

(21) Appl. No.: 17/124,034

(22) Filed: Dec. 16, 2020

(65) Prior Publication Data
US 2021/0367864 A1    Nov. 25, 2021

(30) Foreign Application Priority Data
May 21, 2020   (IN) .............................. 202011021422

(51) Int. Cl.
*G06F 15/173*     (2006.01)
*H04L 41/5074*   (2022.01)
(Continued)

(52) U.S. Cl.
CPC ...... *H04L 41/5074* (2013.01); *G06F 16/7844* (2019.01); *G06V 20/46* (2022.01); *G06V 30/10* (2022.01)

(58) Field of Classification Search
None
See application file for complete search history.

(56) References Cited

U.S. PATENT DOCUMENTS 10,681,060 B2 *  6/2020  Scheidler ............... G06N 20/00
10,831,591 B2 * 11/2020  Upadhyay ........... G06F 11/3034
(Continued)

FOREIGN PATENT DOCUMENTS

CN        107004087 A    *  8/2017  ............. G06F 21/55
WO   WO-2017014823 A2  *  1/2017  ......... G06F 16/3344
WO      2019/122832 A1     6/2019

OTHER PUBLICATIONS

Anonymous, "Issue tracking system" Wikipedia, Jan. 27, 2020, pp. 1-4. Retrieved from the Internet on Sep. 3, 2021. <https://en.wikipedia.org/w/index.php?t%20itle=Issue%20tracking%20system&oldid=937809828>.

*Primary Examiner* — Phyllis A Book
(74) *Attorney, Agent, or Firm* — Mannava & Kang, P.C.

(57) ABSTRACT

In some examples, closed loop monitoring based privileged access control may include identifying a ticket that includes a specification of an incident that is to be remedied and determining an intent of the ticket. A privileged access command library may be analyzed to determine a plurality of privileged access steps that can be performed to remedy the incident. A source file associated with procedures that were performed to remedy the incident may be analyzed. A plurality of events may be identified using the source file and filtered based on the plurality of privileged access steps that can be performed to remedy the incident. At least one event that includes at least one other privileged access step that is not one of the plurality of privileged access steps that can be performed to remedy the incident may be identified, and instructions may be generated to remedy the identified event.

20 Claims, 13 Drawing Sheets

(51) Int. Cl.
    *G06F 16/783*    (2019.01)
    *G06V 20/40*     (2022.01)
    *G06V 30/10*     (2022.01)

(56) References Cited

U.S. PATENT DOCUMENTS

| | | | |
|---|---|---|---|
| 2014/0358944 A1* | 12/2014 | Brower, Jr. | G06Q 10/0639 |
| | | | 707/736 |
| 2019/0222577 A1 | 7/2019 | Eliyahu et al. | |
| 2019/0222597 A1* | 7/2019 | Crabtree | H04L 63/1425 |
| 2020/0042698 A1* | 2/2020 | Urias | G06F 9/545 |

* cited by examiner

1000

IDENTIFY A SPECIFICATION OF AN INCIDENT THAT IS TO BE REMEDIED
1002

ANALYZE, BASED ON THE SPECIFICATION OF THE INCIDENT, A PRIVILEGED ACCESS COMMAND LIBRARY
1004

DETERMINE, BASED ON THE ANALYSIS OF THE PRIVILEGED ACCESS COMMAND LIBRARY, AT LEAST ONE PRIVILEGED ACCESS STEP THAT CAN BE PERFORMED TO REMEDY THE INCIDENT
1006

ANALYZE, BASED ON THE PRIVILEGED ACCESS COMMAND LIBRARY, A SOURCE FILE ASSOCIATED WITH A PROCEDURE THAT WAS PERFORMED TO REMEDY THE INCIDENT
1008

IDENTIFY, BASED ON THE ANALYSIS OF THE SOURCE FILE, A PLURALITY OF EVENTS
1010

FILTER, BASED ON THE AT LEAST ONE PRIVILEGED ACCESS STEP THAT CAN BE PERFORMED TO REMEDY THE INCIDENT, THE PLURALITY OF EVENTS
1012

IDENTIFY, BASED ON THE FILTERING OF THE PLURALITY OF EVENTS, AT LEAST ONE EVENT THAT INCLUDES AT LEAST ONE FURTHER PRIVILEGED ACCESS STEP THAT IS NOT THE AT LEAST ONE PRIVILEGED ACCESS STEP THAT CAN BE PERFORMED TO REMEDY THE INCIDENT
1014

GENERATE, BASED ON THE AT LEAST ONE IDENTIFIED EVENT, INSTRUCTIONS TO REMEDY THE AT LEAST ONE IDENTIFIED EVENT
1016

*FIG. 10*

CLOSED LOOP MONITORING BASED PRIVILEGED ACCESS CONTROL

PRIORITY

The present application claims priority under 35 U.S.C. 119(a)-(d) to Indian patent application number 202011021422, having a filing date of May 21, 2020, the disclosure of which is hereby incorporated by reference in its entirety.

BACKGROUND

In an environment, such as an enterprise environment, routine operations and incidents related to systems, such as servers, networks, etc., may require remedial actions. A user, such as an administrator with privileged system access, may access a system to perform one or more remedial actions to facilitate performance of such operations or for remediating an incident.

BRIEF DESCRIPTION OF DRAWINGS

Features of the present disclosure are illustrated by way of example and not limited in the following figure(s), in which like numerals indicate like elements, in which:

FIG. 10 illustrates a flowchart of an example method for closed loop monitoring based privileged access control in accordance with an example of the present disclosure.

DETAILED DESCRIPTION

Figure 1:
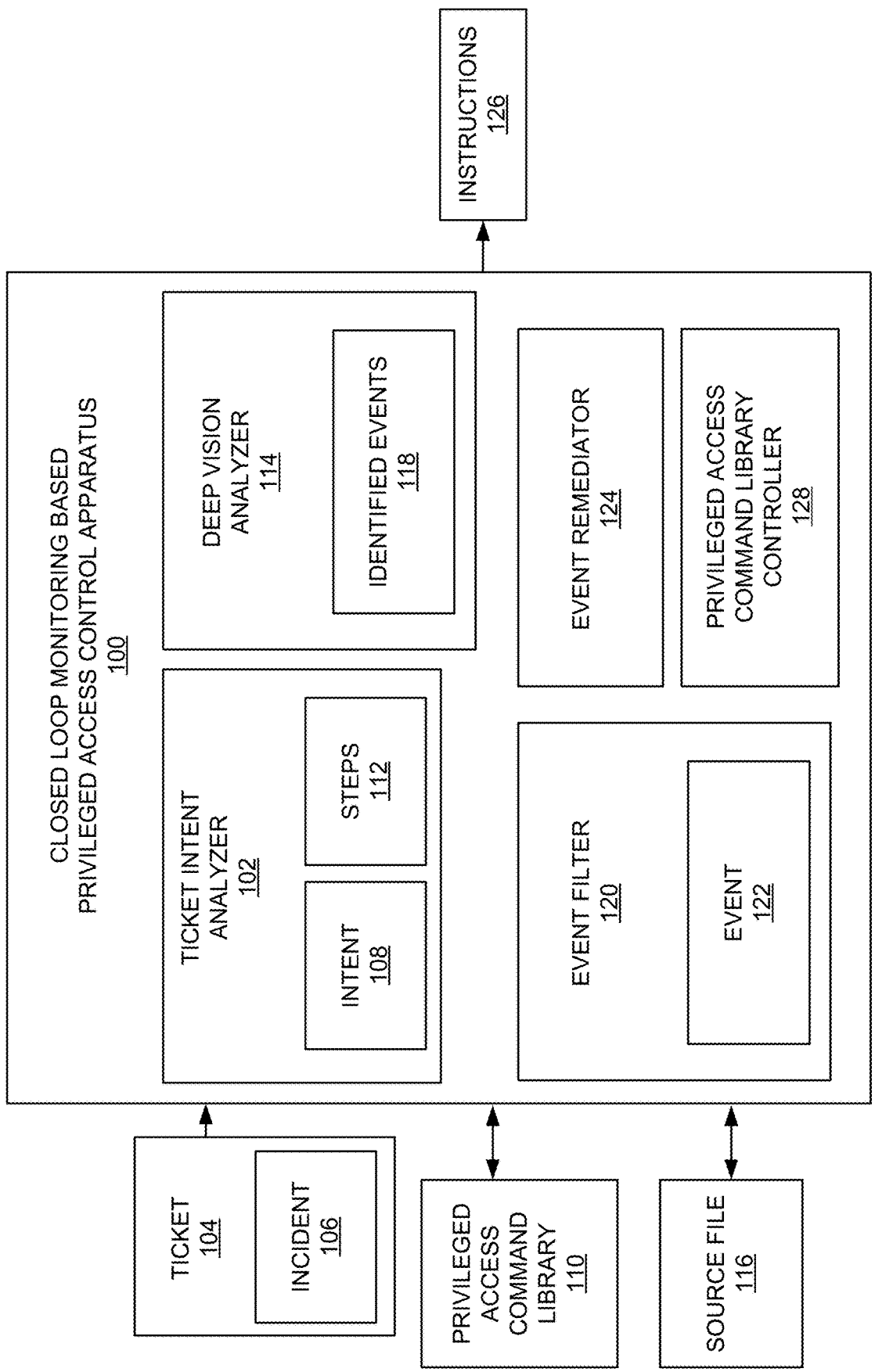
FIG. 1 illustrates a layout of a closed loop monitoring based privileged access control apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Closed loop monitoring based privileged access control apparatuses, methods for closed loop monitoring based privileged access control, and non-transitory computer readable media having stored thereon machine readable instructions to provide closed loop monitoring based privileged access control are disclosed herein. The apparatuses, methods, and non-transitory computer readable media disclosed herein provide for closed loop monitoring of privileged access control based on review of video and text logs, and correlation with service tickets without human intervention to improve compliance, improve quality of log review, reduce related technical and operational expenditures, and remediate an incident based on the review of the video and text logs to identify suspicious events. In this regard, a suspicious event may be described as an event that is not associated with an authorized activity that is performed to remedy an incident. For example, the incident may be specified in a service ticket that includes details of the incident that is to be remedied.

With respect to privileged access management, regulatory compliance requirements may specify that privileged access should be controlled and monitored on a continuous basis due to the high risk nature of such access. The regulatory compliance requirements may also specify that the work that is performed is a 'closed loop' (e.g., user activities using privileged access as captured in text and video logs correspond to what was authorized in an approved service ticket and any deviation should be further investigated and/or remediated to ensure that users with such privileged access are only performing approved activities). For example, enterprises such as banks, etc., may have many systems that are maintained regularly by logging into servers to perform maintenance and remedial activities that are considered as privileged activities and require close monitoring. Hackers may use such access to steal information via a hacking technique known as 'privileged escalation'. Examples of privileged activities may include installing software on a server, starting, modifying, or stopping an activity on a server, etc. These activities may be controlled by a control management procedure. In order to initiate one of these activities, a ticket may be specified to request performance of the activity. Once the ticket is approved, the activity may be performed. In order to perform such an activity, a user, based on privileged access management as provided by a privileged access management system (or a privileged access manager), may be required to have privileged access to perform such activities on a server, or any other system that requires privileged access. The privileged access management system may control access of the user to perform the specified activities. For example, the privileged access management system may provide a login screen for the user to enter a username and password to be granted access to perform the specified activities. The privileged access management system may record a session of any activities performed by the user. For example, the privileged access management system may capture logs of the activities, as well as record a video of any activities performed by the user. Such session recording may be performed to provide auditability and additional control.

In some cases, the user may perform an activity that is not specified by the ticket. In other cases, the user may perform the activity as specified by the ticket, but in a manner that is not specified by the ticket. For example, the user may perform the activity using steps that are different from those steps identified as being acceptable (or authorized) to be performed according to the ticket. Moreover, even for those steps that are identified as being acceptable to be performed according to the ticket, there may be several subjective and objective variations in such steps in accordance with the activity, the platform (e.g., Windows™, Unix™, etc.) associated with the activity, and other such factors. Yet further, in some cases, a ticket may be well formed (e.g., include exact details of what is to be done), while in other cases a ticket may not be well formed (e.g., include a general specification of a problem). In this regard, it is technically challenging to analyze logs and videos, which may include hundreds or thousands of such logs and videos, related to activities performed by a user to determine whether the activities are performed in accordance with the ticket.

In some cases, with respect to "hacking", an unauthorized entity may gain access to a privileged account and thereby gain unauthorized access to a server or another system. In this regard, it is technically challenging to analyze logs and videos, which may include hundreds or thousands of such logs and videos, related to activities performed by privileged users to identify an activity performed by an unauthorized entity.

In order to address at least the aforementioned technical challenges, the apparatuses, methods, and non-transitory computer readable media disclosed herein may identify specific events from the logs and videos, where such identified events may be designated as suspicious events. The suspicious events may be forwarded to an event remediator that may automatically (e.g., without human intervention) generate instructions to remedy the suspicious events. For example, the event remediator may generate instructions to remove access to a system (e.g., a server, a network, or another component) associated with the incident to remedy the suspicious events. According to another example, the event remediator may reduce access to the system associated with the incident to remedy the suspicious event. Generally, the event remediator may generate instructions to perform any action (e.g., raise a further ticket, generate an alarm, etc.) needed to remedy the suspicious event.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in several different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example closed loop monitoring based privileged access control apparatus (hereinafter also referred to as "apparatus 100").

Referring to FIG. 1, the apparatus 100 may include a ticket intent analyzer 102 that is executed by at least one hardware processor (e.g., the hardware processor 902 of FIG. 9, and/or the hardware processor 1104 of FIG. 11) to identify a ticket 104 that includes a specification of an incident 106 that is to be remedied. For example, the ticket 104 may specify steps such as, "As an administrative user, I want to restart windows update service". In this example, the incident 106 may include performing a restart of a running application or service. In other examples, an incident 106 may include correcting an operational error, updating an application, removing an application, etc.

The ticket intent analyzer 102 may determine, based on an analysis of the ticket 104, an intent 108 of the ticket 104. For the ticket 104 that specifies that "As an administrative user, I want to restart windows update service", the ticket intent analyzer 102 may determine the intent 108 as "windows service restart". In this regard, if the ticket 104 is not well formed, the ticket intent analyzer 102 may utilize natural language processing to determine (e.g., infer) the intent 108 of the ticket 104.

The ticket intent analyzer 102 may analyze, based on the determined intent 108 of the ticket 104, a privileged access command library 110. Further, the ticket intent analyzer 102 may determine, based on the analysis of the privileged access command library 110, a plurality of privileged access steps 112 that can be performed to remedy the incident 106. In this regard, the privileged access command library 110 may map the intent 108 to the plurality of privileged access steps 112 that can be performed to remedy the incident 106. For example, for the ticket 104 that specifies that "As an administrative user, I want to restart windows update service", the ticket intent analyzer 102 may determine, based on the analysis of the privileged access command library 110, a plurality of privileged access steps 112 that can be performed to remedy the incident 106 as "1. Open Windows™ service center, 2. Stop service: Windows™ update service. 3. Start service: Windows™ update service." The plurality of privileged access steps 112 may include commands and alternative commands that are expected to be performed, a sequence of the commands, as well as any particular systems that are to be utilized during execution of the commands. For example, the sequence of commands may include "Open Windows Service Manager" and "Start the service", or alternatively "Open Command Prompt as Administrator" and "Run command: net start *". Other examples of commands may include installation related events, modification related events, and other such events that may be specified as being relevant to implementation of a remedy for the incident 106.

A deep vision analyzer 114 that is executed by at least one hardware processor (e.g., the hardware processor 902 of FIG. 9, and/or the hardware processor 1104 of FIG. 11) may analyze a source file 116 associated with procedures that were performed to remedy the incident 106. For example, the source file 116 may be generated during or after resolution of the incident 106. The source file 116 may include a video file. Further, the deep vision analyzer 114 may identify, based on the analysis of the source file 116, a plurality of events 118. For example, the deep vision analyzer 114 may extract text (e.g., using optical character recognition) from the source file 116 (which may include a video, as well as logs) to identify the plurality of events 118. In other cases, where an event pertains to dragging of a file, copying of a file using a mouse click operation, and other such operations, these types of events may be identified by utilizing a machine learning model of the deep vision analyzer 114. Thus, the deep vision analyzer 114 may identify the events 118 based on analysis of text that is extracted, as well as actions that are performed (e.g., using the machine learning model). The events 118 may also be designated identified events 118. Examples of the identified events 118 may include commands that are performed, a sequence of the commands, as well as any systems that are utilized during execution of the commands. Examples of commands may include installation related commands, modification related commands, and other such commands that may be specified as being relevant to implementation of a remedy for the incident 106.

With respect to analysis of the source file 116, the deep vision analyzer 114 may initially identify events that include commands as well as actions that are performed. From these initially identified events, the deep vision analyzer 114 may identify, based on the privileged access command library 110, the events 118 that are to be further evaluated. For the ticket 104 that specifies "As an administrative user, I want to restart windows update service", the deep vision analyzer 114 may detect an activity "Run services.msc" that opens the Windows™ Service Manager and further detect a signature (e.g., 602 of FIG. 6) mentioning "Windows™ is attempting to start following service on Local computer" with added context identified as "Startup type: manual". The deep vision analyzer 114 may narrow the field of the initially identified events to the events 118 based on the analysis of the source file with respect to the privileged access command library 110.

An event filter 120 that is executed by at least one hardware processor (e.g., the hardware processor 902 of FIG. 9, and/or the hardware processor 1104 of FIG. 11) may filter, based on the plurality of privileged access steps 112 that can be performed to remedy the incident 106, the plurality of events 118. Further, the event filter 120 may identify, based on the filtering of the plurality of events 118, at least one event 122 that includes at least one other privileged access step that is not one of the plurality of privileged access steps that can be performed to remedy the incident 106. For example, for the ticket 104 that specifies "As an administrative user, I want to restart windows update service", an event 122 may have been generated that specifies "Change Windows™ Registry" that was not within the constraints of the deciphered intent 108 "windows service restart". The event 122 may be designated a suspicious event.

An event remediator 124 that is executed by at least one hardware processor (e.g., the hardware processor 902 of FIG. 9, and/or the hardware processor 1104 of FIG. 11) may generate, based on the at least one identified event 122, instructions 126 to remedy the at least one identified event 122. For example, for the ticket 104 that specifies "As an administrative user, I want to restart windows update service", an event 122 may have been generated that specifies "Change Windows™ Registry", which does not match the intent 108 "windows service restart" and therefore would produce the instructions 126 as "Suspicious Activity Detected: Change Windows Registry on HKIM/XXXX with entry of DWORD 1 at time 10:10 of video and has severity level of HIGH."

According to examples disclosed herein, the ticket intent analyzer 102 may determine, based on the analysis of the ticket 104, the intent 108 of the ticket 104 by utilizing natural language processing to determine the intent 108 of the ticket 104.

According to examples disclosed herein, the ticket intent analyzer 102 may determine, based on the analysis of the privileged access command library 110, the plurality of privileged access steps that can be performed to remedy the incident 106 by mapping the determined intent 108 of the ticket 104 to records of the privileged access command library 110 to determine the plurality of privileged access steps that can be performed to remedy the incident 106.

According to examples disclosed herein, the ticket intent analyzer 102 may map the determined intent 108 of the ticket 104 to the records of the privileged access command library 110 to determine the plurality of privileged access steps that can be performed to remedy the incident 106 by mapping the determined intent 108 of the ticket 104 to an action and a signature of each record of the records of the privileged access command library 110 to determine the plurality of privileged access steps that can be performed to remedy the incident 106.

According to examples disclosed herein, the deep vision analyzer 114 may analyze, based on the privileged access command library 110, the source file associated with procedures that were performed to remedy the incident 106 by utilizing optical character recognition to analyze the video file, extracting, based on the optical character recognition-based analysis of the video file, text from the video file, and matching the text from the video file to records of the privileged access command library 110 to identify the plurality of events 118.

According to examples disclosed herein, the deep vision analyzer 114 may identify, based on the analysis of the source file 116, the plurality of events 118 that include a privileged access-based command, or a privileged access-based action.

According to examples disclosed herein, the event remediator 124 may generate, based on the at least one identified event, the instructions 126 to deny access (e.g., remove a user's access) to a system (e.g., system 208 of FIG. 2) associated with the incident 106 to remedy the at least one identified event, or reduce access (e.g., to allow only limited access to perform certain functions) to the system associated with the incident 106 to remedy the at least one identified event.

According to examples disclosed herein, a privileged access command library controller 128 that is executed by at least one hardware processor (e.g., the hardware processor 902 of FIG. 9, and/or the hardware processor 1104 of FIG. 11) may determine whether the at least one identified event requires performance of a procedure to remedy the at least one identified event. Further, based on a determination that the at least one identified event does not require performance of the procedure to remedy the at least one identified event, the privileged access command library controller 128 may update the privileged access command library 110 to include the at least one identified event as part of the plurality of privileged access steps that can be performed to remedy the incident 106.

Operation of the apparatus 100 is described in further detail with reference to FIGS. 1-8.

Referring to FIG. 1, the deep vision analyzer 114 may operate in conjunction with the privileged access command library 110 to identify and extract events of interest from source data (e.g., the source file 116) to generate the identified events 118. Further, the deep vision analyzer 114 may enrich the identified events 118 with additional context. The identified events 118 may include, for example, actions including commands, tasks, or any sequence which is identified as a unique pattern for further analysis. For the ticket 104 that specifies "As an administrative user, I want to restart windows update service", the deep vision analyzer 114 may yield a sequence of identified events 118 such as "Open Command Prompt as Administrator" and "Run command: net start servicename". An alternative sequence of events for the same example may produce identified events 118 as "Open Windows™ Service Manager", "Startup Type: Manual", "Start parameters:", "Windows™ is attempting to start the following service on local computer—Windows™ Update Service". These events may have an intent related to restarting of windows service and may form part of the same context that was authorized as part of the original incident. The identified events 118 may be converted into a format, such as a JSON format, and made available for further processing. The identified events 118 may be broadcasted to multiple systems in real time using streaming technologies. Further, the identified events 118 may be transferred through point to point connectors or batches of events.

The deep vision analyzer 114 may identify and extract events of interest from source data to generate the identified events 118 for security monitoring review and analysis filtering. In this regard, the filtering may be performed by the event filter 120 to eliminate irrelevant events that may be of insignificant or no use. For example, in a source file 116 that includes a video session of fifteen minutes of Windows™ server maintenance activity recorded through a privileged access management solution such as CyberArk™, a user, who may include a privileged access user, may have browsed around looking at different desktop windows for several minutes but only performed changes on configurations that take less than a minute. The deep vision analyzer 114, using the privileged access command library 110, may extract the event of the configuration change along with a few other events where the user may have opened configuration files or folders which are only expected to be opened or touched to perform other access jobs. The deep vision analyzer 114 may filter out all other events which have no relevance for further review by the event filter 120. For example, the deep vision analyzer 114 might truncate periods of no activity (ascertained by no mouse movement and keyboard activity in the video source file 116), or remove periods of system startup or loading periods of progress where no further actions are detected or have no relevance to privileged access command library 110. Then, from the remaining session, the event filter 120 may match the action signatures described in the privileged access command library 110 to generate the event 122 that does not match the intent 108. The deep vision analyzer 114 may enrich the identified events 118 with additional context from the privileged access command library 110. For example, the additional context may include when such a configuration can occur, possible intent of executing the configuration change, perceived risk level, related actions, signature of the time at which the event occurred in the source file 116, etc.

With respect to the event filter 120, the deep sense capability of the event filter 120 may receive the output of the deep vision analyzer 114 and utilize the ticket intent analyzer 102 to filter out suspicious events from all the events identified by the deep vision analyzer 114. In this regard, a ticket may take multiple routes for resolution with one or more patterns. The event filter 120 may determine if the events and their sequence of execution identified by deep sense conforms to the events and the sequence expected by the ticket intent analyzer 102 to resolve such tickets. With respect to comparison of features of the identified events 118 to features of the steps determined by the ticket intent analyzer 102 to determine the suspicious event 122, the identified events may include the components action, signature, context, intent and risk as shown at 400 in FIG. 4. The intent of these events may be compared against the intent 108 of the authorized ticket 104. If intent matches that of the ticket, the event is identified as non-suspicious, and is otherwise classified as suspicious of the risk type as mentioned at 400 in FIG. 4. For the ticket 104 that specifies "As an administrative user, I want to restart windows update service", the intent 108 may be subsequently evaluated as "windows service restart". Additionally, the deep vision analyzer 114 may have produced an identified event 118 of "Change in windows registry". After mapping the event 118 against the privileged access steps 112, a mismatch would be found in the intent 108 "windows service restart" and event 118 "Change in windows registry", thus resulting in the generation of the instructions 126 as "Suspicious Activity Detected: Change Windows Registry on HKIM/XXXX with entry of DWORD 1 at time 10:10 of video and has severity level of HIGH." The event filter 120 may flag any deviation as a suspicious event.

As an example, assuming that the ticket 104 specifies a patch task for a Unix™ system, such a patch task may involve commands (e.g., as determined by the ticket intent analyzer 102) such as tar, patch-b, patch-dry-run, and patch. Any variation to the execution sequence or commands may be flagged as suspicious by the event filter 120. The potential outcome of the suspicious event 122 upon further verification may lead to remediation by the event remediator 124. In this regard, a secondary confirmation may be performed by the event remediator 124 to determine whether the event 122 is malicious, unintended, or incorrect, which may cause damage and disruption, or whether the event 122 is legitimate but not well documented in the ticket 104 or an alternate mechanism to execute a task specified in the ticket 104. An un-detected alternate mechanism to perform a task may be fed back (e.g., by the privileged access command library controller 128) to the privileged access command library 110 to enrich the book of records of the privileged access command library 110 so that future false positives (e.g., designation of an event as a suspicious event) can be avoided.

Figure 2:
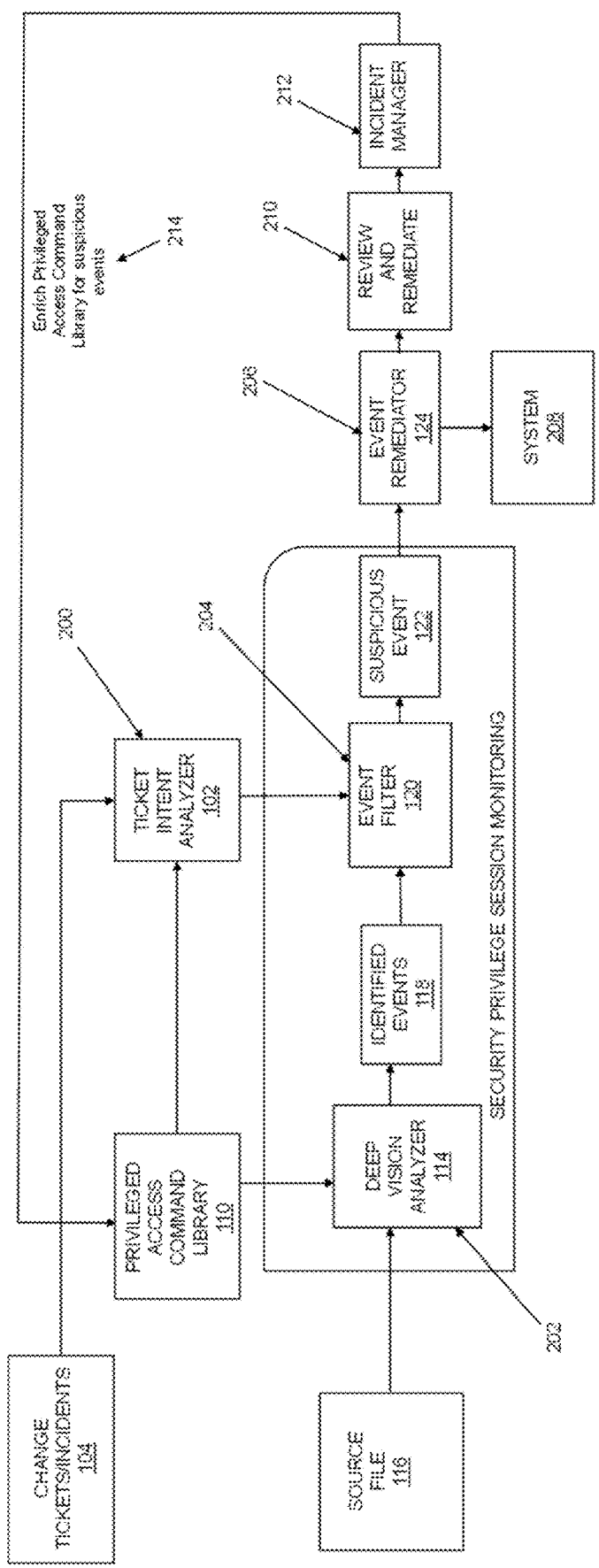
FIG. 2 illustrates a logical flow associated with the closed loop monitoring based privileged access control apparatus of FIG. 1 in accordance with an example of the present disclosure.

FIG. 2 illustrates a logical flow associated with the apparatus 100 in accordance with an example of the present disclosure.

Referring to FIG. 2, at block 200, the ticket intent analyzer 102 may receive a ticket 104 (which may also be designated as an incident ticket). The ticket 104 may specify an incident 106 that is to be remedied, and in some cases, a privileged access service that can be performed to remedy the incident 106. For example, the ticket 104 may specify "Severity Critical event generated from xxxx.in.CompanyABC.com (Serial: xxxxxxxxx INT): The provider failed while storing notifications from the driver. The Virtual Disk Service should be restarted. hr=xxxxxxx". The ticket intent analyzer 102 may ascertain, from the privileged access command library 110, a plurality of privileged access steps 112 that can be performed to remedy the incident 106. For example, the privileged access steps 112 may include ""Serial", "Severity Critical event", "notifications", "provider", "Virtual Disk Service", "PRD", "driver", "hr", "restart"".

At block 202, the deep vision analyzer 114 may perform a deep vision analysis on the source file 116. For example, the deep vision analyzer 114 may identify video insights by performing optical character recognition (OCR) extraction and obtaining screen images. In this regard, the deep vision analyzer 114 may analyze, based on the privileged access command library 110, the source file 116 to generate a plurality of identified events 118 from the source file 116. For the example of the ticket 104 disclosed herein with respect to block 200, the identified events may include write operations (categorized by the privileged access command library 110 to denote any activity that changed or modified anything in the system as opposed to "read" operations where no modifications were done) such as:

```
{
    "WRITE_OPERATIONS": [{
            "command_description": "Windows Service Being started: Adobe Update Service",
            "command_parameters": ["-flag ignoreErrors"],
            "intent": ["Windows Service start"],
            "riskLevel": "MEDIUM",
            "occurrence": {
                "startTime": "01:10:12",
                "endTime": "01:19:12"
            }
        }, {
            "command_description": "Windows registry update : HKIM/abc/xyz",
            "command_parameters": ["DWORD 1"],
            "intent": ["Change Windows Registry"],
            "riskLevel": "HIGH",
            "occurrence": {
                "startTime": "01:20:12",
                "endTime": "01:29:12"
            }
        }
    ],
    "READ_OPERATIONS": [
        "command_description": "Open Windows Service Manager",
        "command_parameters": [ ],
        "occurrence": {
            "startTime": "01:01:12",
            "endTime": "01:49:12"
        }
    ]
}}
```

At block 204, the event filter 120 may filter, based on the privileged access steps 112 that can be performed to remedy the incident 106, the identified events 118 to identify a suspicious event 122. For the example of the ticket 104 disclosed herein with respect to block 200, the event filter 120 may filter the identified events 118 on the criterion that any plurality of intents of ticket 104 identified by ticket intent analyzer 102 should match changes or modification activity in identified events 118 and all intents outside of this criterion would fall under the suspicious event 122. In this regard, suspicious events may be identified as the "write" activities with dissimilar intents from the ones generated by ticket intent analyzer 102 follows:
Activity Detected: ["Change Windows Registry"]
Review Period: ["From 01:20:12 to 01:29:12."]. In this context, the "Review Period" may represent the time period between which the suspicious event started and ended.

At block 206, the event remediator 124 may control operation of a system 208 that is affected by the suspicious event 122 to minimize or eliminate an impact of the suspicious event 122. In many cases, the event remediator 124 may provide notification of the suspicious event 122 with details of event activity as discovered by the identified events 118 along with risk level and review period (e.g., for a video source file 116, the review period would be the exact time in the video when the activity occurred). The event remediator 124 may also provide automated (e.g., without human intervention) remediation based on steps that are provided within the privileged access command library 110. For example, the event remediator 124 may control operation of the system 208 to shut down the system 208. Alternatively, the event remediator 124 may control operation of the system 208 to direct network traffic from the system 208, that may include a server, to another system until the impact of the suspicious event 122 has been eliminated. For the example of the ticket 104 that specifies "As an administrative user, I want to restart windows update service", and the event 122 that may have specified "Change Windows Registry" that was not within the constraints of the deciphered intent 108 "windows service restart", the event remediator 124 may generate the instructions 126 to perform the following operations:
{"TICKET_NUMBER": "INC0XXXX", "SESSION_ID": "xxxxx-xxxx-xxx-xxxx-xxxxxxxx", "VIDEO_OPERATION_TYPE": "WRITE", "TICKET_OPERATION_TYPE": "WRITE", "REVIEW_REQUIRED": "Yes", "RISK_LEVEL": "Very High", "ACTION_SUMMARY": {"Suspicious Event": "Change activities detected on the session of the video but action does not match ticket description.", "Ticket Description": "As an administrative user, I want to restart windows update service.", "Activity Detected": ["Windows registry update: HKIM/abc/xyz"], "Review Period": ["From 01:20:12 to 01:29: 12."]}.[

With respect to operation of the event remediator 124, at block 210, the instructions 126 sent by the event remediator 124 to control operation of the system 208 may be reviewed. For example, a report may be generated to specify the suspicious event 122 and the associated instructions 126. For example, the report may specify a severity associated with the suspicious event 122. Alternatively, or additionally, the report may specify actions that are taken to remedy the suspicious event 122. Alternatively, or additionally, an alert associated with the suspicious event 122 may be generated. For example, the alert may also correspond to a severity associated with the suspicious event 122.

At block 212, the report may be reviewed, for example, by a privileged access management specialist. For example, the privileged access management specialist may include an incident manager.

At block 214, the privileged access command library 110 may be enriched based on the suspicious event 122. For example, if the incident manager indicates that the suspicious event 122 is indeed an unauthorized event, the privileged access command library 110 may be enriched to confirm that the suspicious event 122 is indeed correctly identified, and the associated remedy. Alternatively, assuming that the incident manager indicates that the suspicious event 122 is not an unauthorized event, the privileged access command library 110 may be enriched to include the indication that the suspicious event 122 is not an unauthorized event so that in the future, the event is not flagged as a suspicious event.

Figure 3:
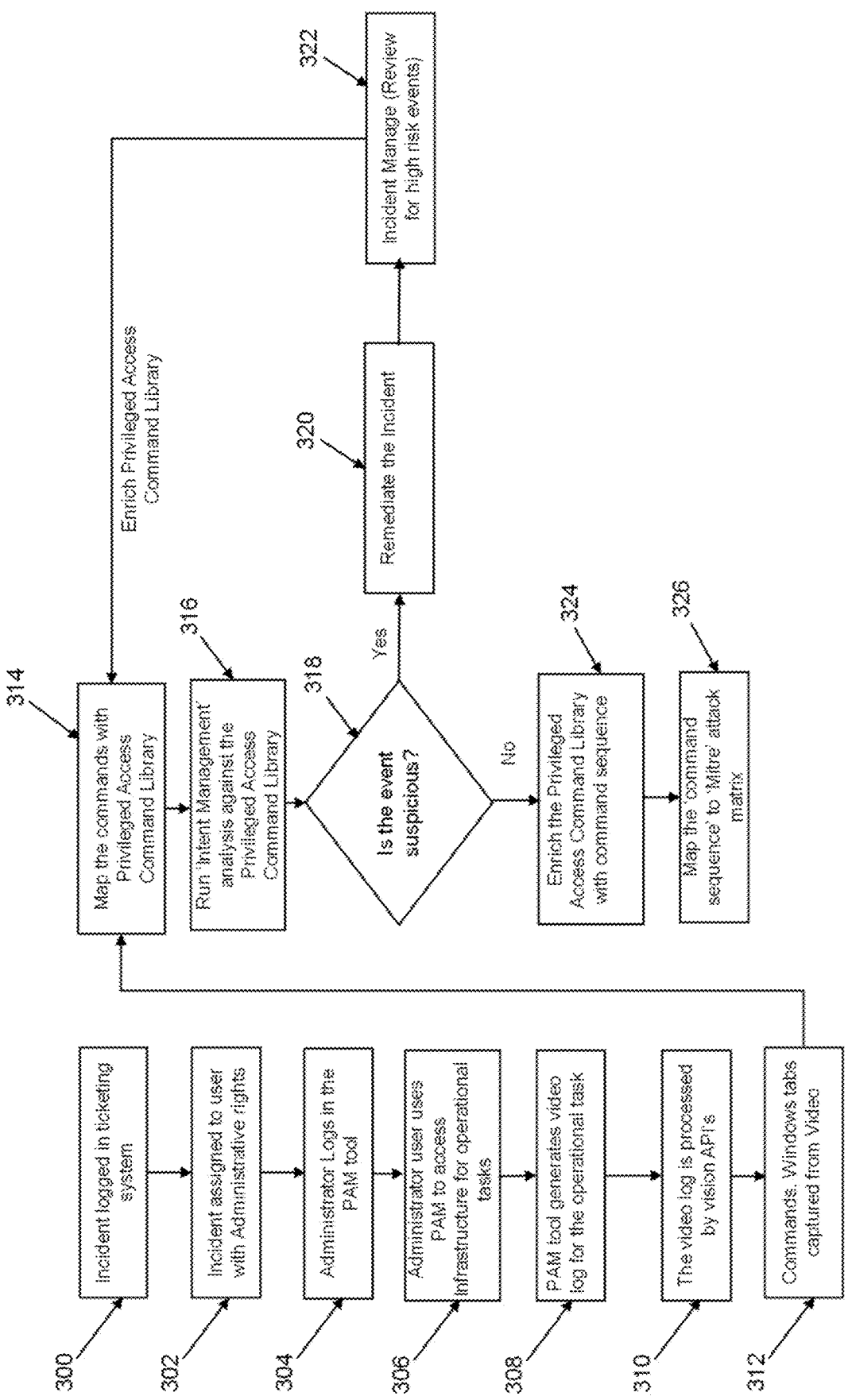
FIG. 3 illustrates further details of the logical flow associated with the closed loop monitoring based privileged access control apparatus of FIG. 1 in accordance with an example of the present disclosure.

FIG. 3 illustrates further details of the logical flow associated with the apparatus 100 in accordance with an example of the present disclosure.

Referring to FIG. 3, at block 300, an incident (e.g., the incident 106) may be logged in a ticketing system to generate the ticket 104.

At block 302, the incident 106 (e.g., for the ticket 104) may be assigned to a user (e.g., administrator) with administrative rights. For example, the user may be authorized to perform the privileged access steps 112 that can be performed to remedy the incident 106.

At block 304, the user (e.g., administrator) may log in a privileged access management tool. For example, the user may log in to perform the privileged access steps 112.

At block 306, the user may use the privileged access management tool to access the appropriate infrastructure to perform the privileged access steps 112.

At block 308, the privileged access management tool may generate a video log (e.g., as the source file 116) of any procedures performed by the user.

At block 310, the video log may be processed by the deep vision analyzer 114.

At block 312, the deep vision analyzer 114 may identify events from the source file 116, where the events may include, for example, actions including commands, tasks, or any sequence which is identified as a unique pattern.

At block 314, the deep vision analyzer 114 may extract events of interest from the source file 116 to generate the identified events 118. In this regard, the deep vision analyzer 114 may map the identified events to the privileged access command library 110. The identified events 118 may include, for example, actions including commands, tasks, or any sequence which is identified as a unique pattern.

At block 316, the ticket intent analyzer 102 may perform an intent management analysis with respect to the ticket 104 and the privileged access command library 110.

At block 318, the event filter 120 may filter, based on the plurality of privileged access steps 112 that can be performed to remedy the incident 106, the plurality of events 118. Further, the event filter 120 may identify, based on the filtering of the plurality of events 118, at least one event 122 that includes at least one other privileged access step that is not one of the plurality of privileged access steps that can be performed to remedy the incident 106. The at least one event 122 may be designated a suspicious event.

At block 320, for each suspicious event, the event remediator 124 may generate, based on the at least one identified event 122, instructions 126 to remedy the at least one identified event 122.

At block 322, the instructions 126 sent by the event remediator 124 to control operation of the system 208 may be reviewed, as disclosed herein with respect to block 210 of FIG. 2.

At block 324, if the event 122 is not suspicious, the privileged access command library 110 may be enriched based on the event 122, as disclosed herein with respect to location 214 of FIG. 2. For example, assuming that the incident manager indicates that the suspicious event 122 is not an unauthorized event, the privileged access command library 110 may be enriched to include the indication that the suspicious event 122 is not an unauthorized event so that in the future, the event is not flagged as a suspicious event. In this regard, the privileged access command library 110 may be enriched to include the command sequence associated with the event 122 that is determined to not be an unauthorized event.

At block 326, the command sequence for the event 122 that is used to enrich the privileged access command library 110 at block 324 may be mapped to a "Mitre" attack matrix. The Mitre attack matrix may help establish the behavior of a user with malicious intent by following a sequence of commands that a typical external hacker may follow.

Figure 4:
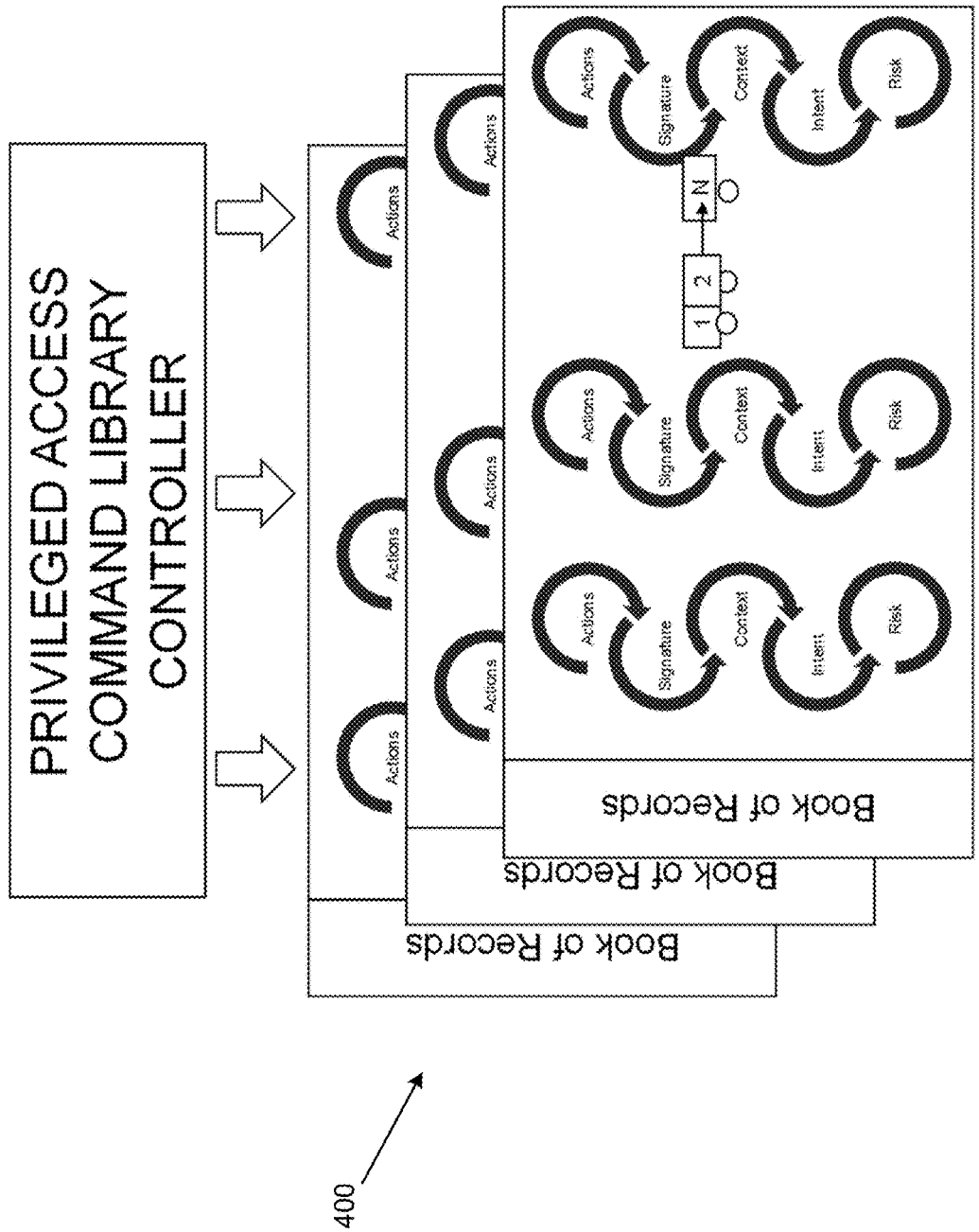
FIG. 4 illustrates a layout of a privileged access command library to illustrate operation of the closed loop monitoring based privileged access control apparatus of FIG. 1 in accordance with an example of the present disclosure.

FIG. 4 illustrates a layout of the privileged access command library 110 to illustrate operation of the apparatus 100 in accordance with an example of the present disclosure.

Referring to FIG. 4, the privileged access command library controller 128 may control operations related to the retrieval and update of records of the privileged access command library 110. For example, the privileged access command library 110 may represent a plug and play component which may be used in multiple contexts. The privileged access command library 110 may be platform independent. The privileged access command library 110 may include a plurality of records, where the records may be grouped in a book of records (e.g., three book of records 400 shown in FIG. 4). A record may represent a collection of information, tasks, commands and sequences thereof, where the commands and sequences thereof may be in the context of action and its remediation in case this action is identified as a suspicious activity. This may be closely associated with either the type of infrastructure system where closed loop monitoring may be used for security recording, for example, for a hardware infrastructure such as a Windows™ operating system or Linux™ operation systems. The privileged access command library controller 128 may acquire and apply machine learning and intelligence data to enrich the books of records with newly identified contexts. Each book of record may be specific to a type of infrastructure and scenario, and thus, there may be many books of records for various contexts. The privileged access command library controller 128 may identify the infrastructure type and scenario, and load the corresponding book of records.

Figure 5:
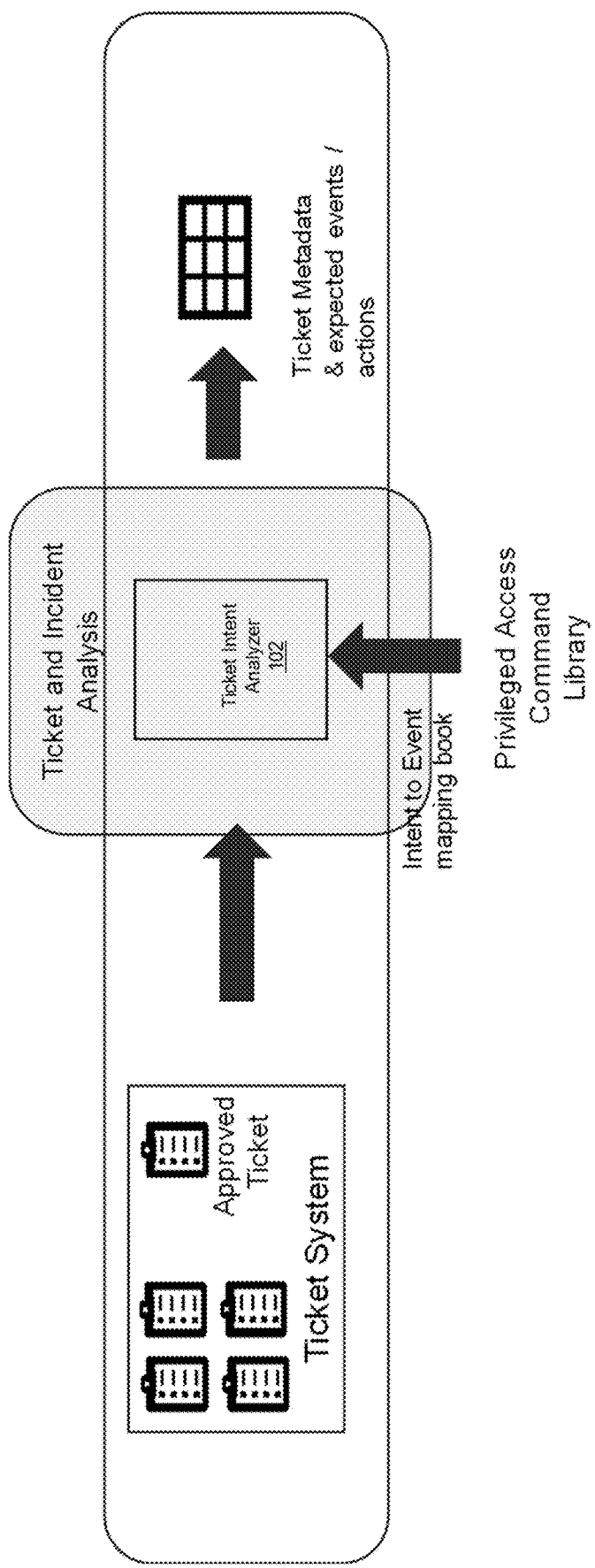
FIG. 5 illustrates a layout of a ticket intent analyzer to illustrate operation of the closed loop monitoring based privileged access control apparatus of FIG. 1 in accordance with an example of the present disclosure.

FIG. 5 illustrates a layout of the ticket intent analyzer 102 to illustrate operation of the apparatus 100 in accordance with an example of the present disclosure.

Referring to FIG. 5, the ticket intent analyzer 102 may receive a ticket (e.g., the ticket 104) and incident data associated with the incident 106 as specified in the ticket 104. The ticket intent analyzer 102 may utilize the privileged access command library 110 to determine an intent, expected actions, and expected sequence of actions (e.g., sequence of commands, etc.) which are expected to be performed to resolve the incident 106.

Figure 6:
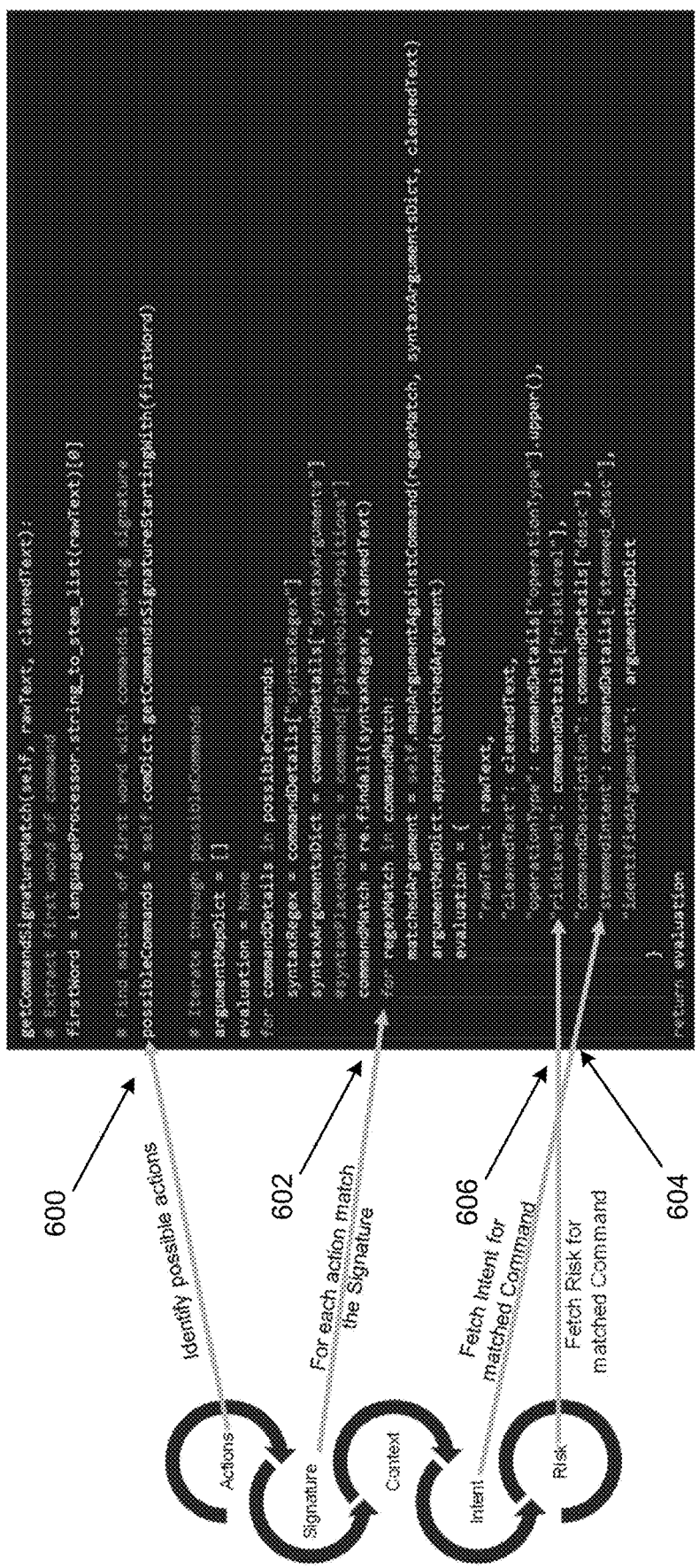
FIG. 6 illustrates a record identification code snippet to illustrate operation of the closed loop monitoring based privileged access control apparatus of FIG. 1 in accordance with an example of the present disclosure.

FIG. 6 illustrates a record identification code snippet to illustrate operation of the apparatus 100 in accordance with an example of the present disclosure.

Referring to FIG. 6, for the record identification code snippet, as disclosed herein, each record of a book of records may be organized with respect to actions, signature, context, intent, and risk. For example, the actions may include identification of possible actions, for example, at 600 (e.g., "possibleCommands=self.comDict.getCommandsSignature StartingWith(firstWord"). For each action, the signature may be matched as shown at 602 to a command (e.g., "for regexMatch in commandMatch:"). At 604, the intent for the matched command may be fetched (e.g., ""stemmedIntent": commandDetails["stemmed_desc"]". At 606, a risk associated with the matched command may be fetched (e.g., ""riskLevel": commandDetails["riskLevel"]"). In addition, context may be fetched from the arguments (e.g., "identifiedArguments": argumentMapDict) being used in the command to show the target of the activity (e.g., which Windows™ service is being restarted). Arguments may provide context, because arguments may represent the matched items in the regex (e.g., "windows starting service *" where * would be the service name and is supposed to be in the argument). All of the information from 600 to 606 may be stored as a single identified event 118, and may thereafter be correlated against similar information stored in a sequence for other identified events 118, thus providing a view of the plurality of activities performed and categorizing events with similar intents.

Figure 7A:
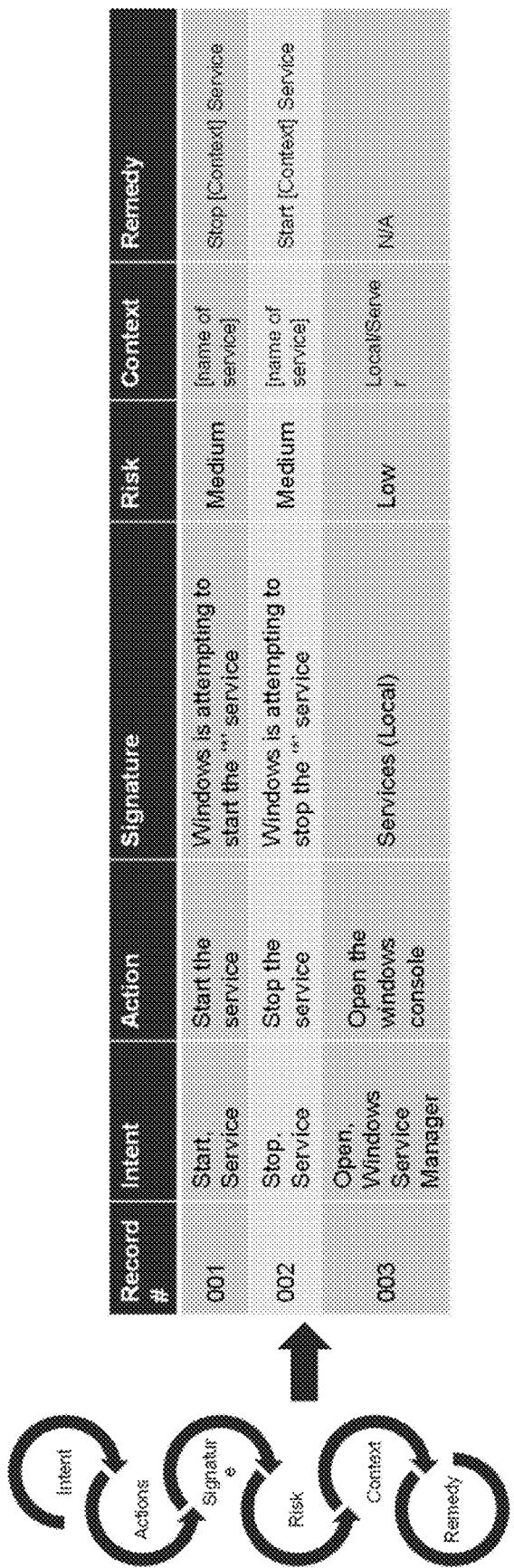
FIGS. 7A and 7B illustrate a Windows™ based record definition example to illustrate operation of the closed loop monitoring based privileged access control apparatus of FIG. 1 in accordance with an example of the present disclosure.
Figure 7B:
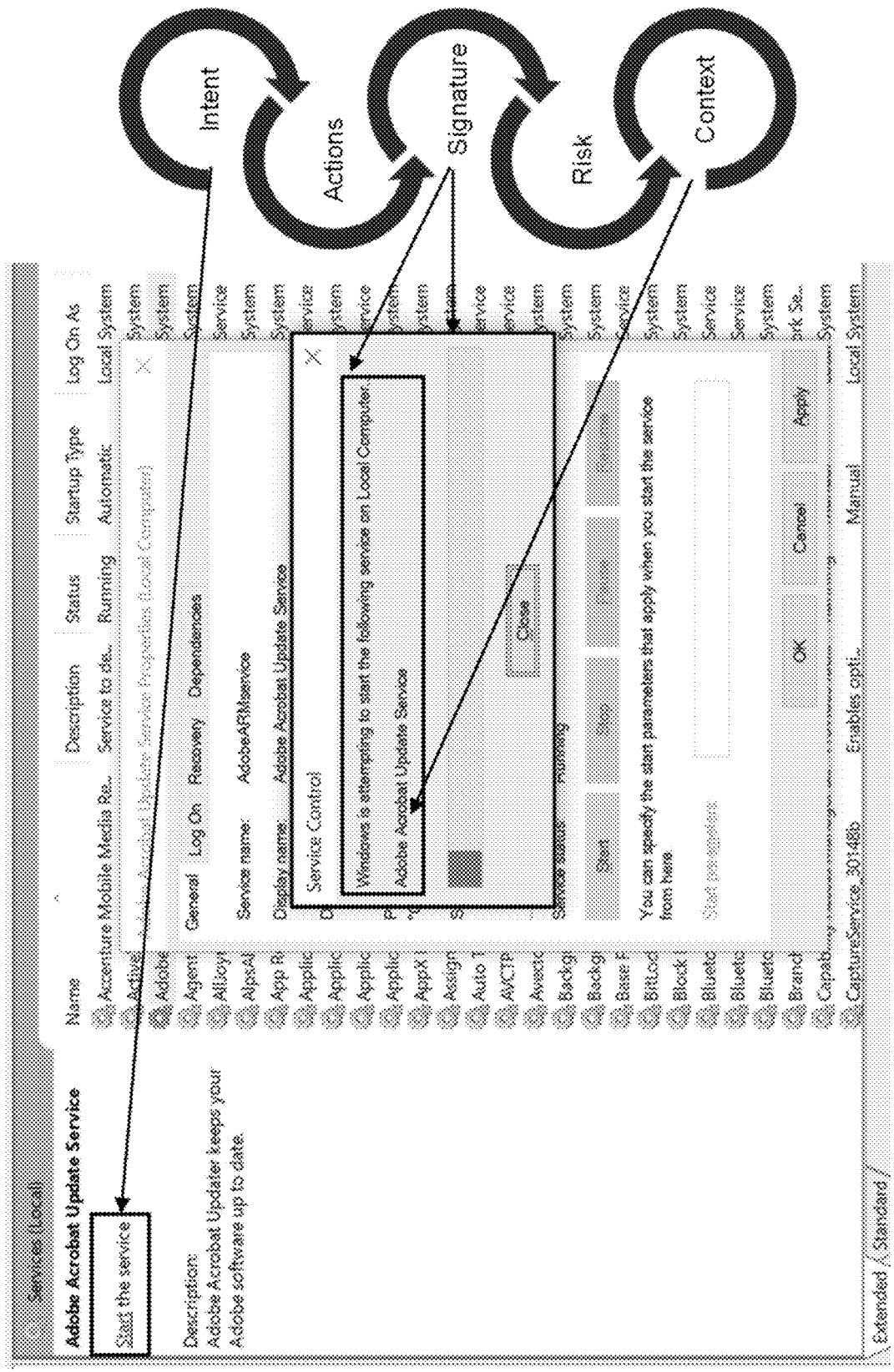

FIGS. 7A and 7B illustrate a Windows™ based record definition example to illustrate operation of the apparatus 100 in accordance with an example of the present disclosure.

Referring to FIGS. 7A and 7B, a record (e.g., Record #1) for the privileged access command library 110 may include an intent of "Start Service", an action as "Start the service", a signature as "Windows is attempting to start the '*' service", a risk as medium, a context as "[name of service]", and a remedy as "Stop [Context] services". Other records such as Record #2 and Record #3 are shown in FIG. 7A. FIG. 7B shows details of how the events 118 are identified using command signature, how the context value is extracted, and how the intents are identified from the source file 116.

Figure 8:
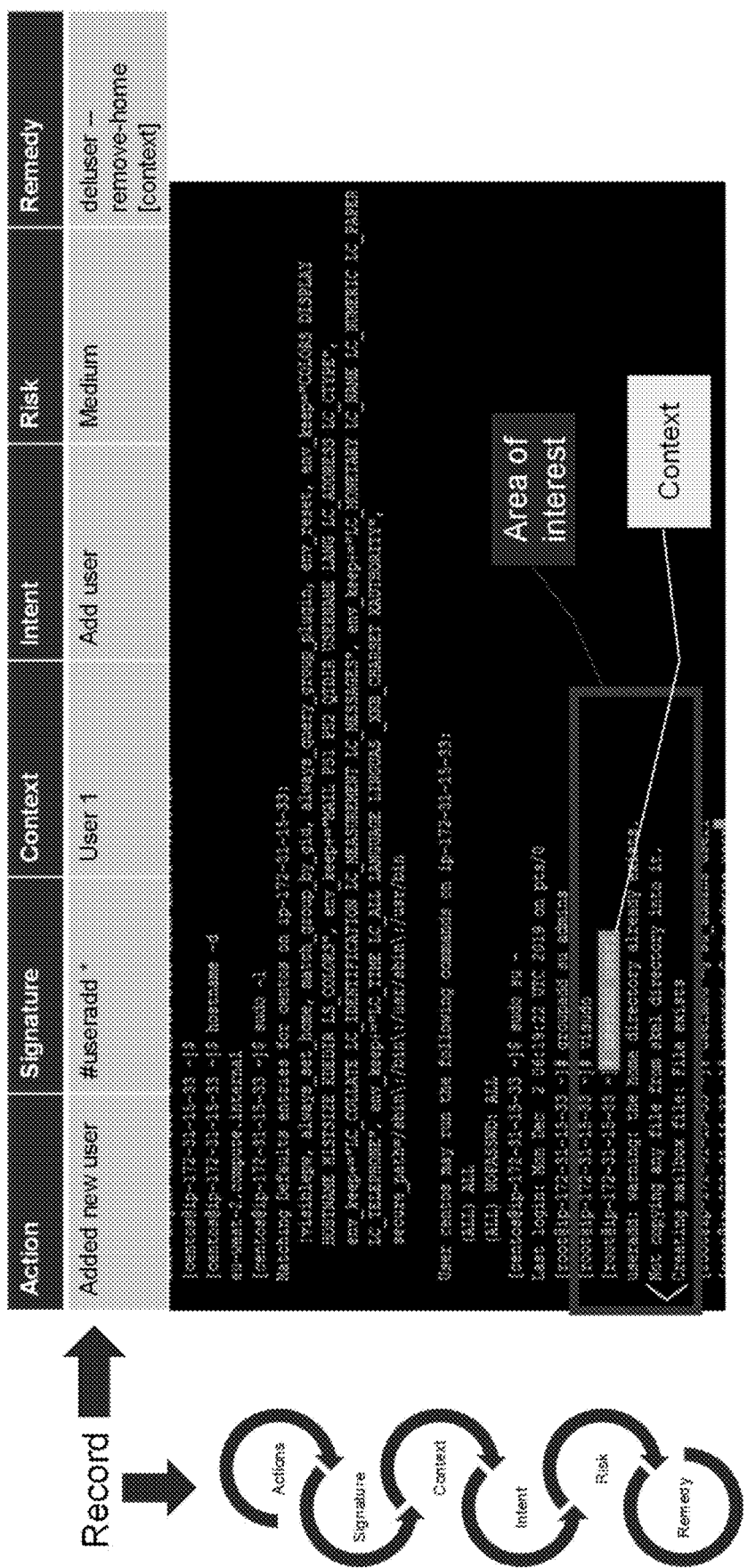
FIG. 8 illustrates a Unix™ based record definition example to illustrate operation of the closed loop monitoring based privileged access control apparatus of FIG. 1 in accordance with an example of the present disclosure.

FIG. 8 illustrates a Unix™ based record definition example to illustrate operation of the apparatus 100 in accordance with an example of the present disclosure.

Referring to FIG. 8, a record for the privileged access command library 110 may include an action as "added new user", a signature as "#useradd*", a context as "User 1", an intent as "Add user", and a risk as medium, and a remedy as "deluser—remove-home [context]". FIG. 8 further shows details of how the events 118 are identified using command signature, how the context value is extracted, and how the intents are identified from the source file 116.

Figure 9:
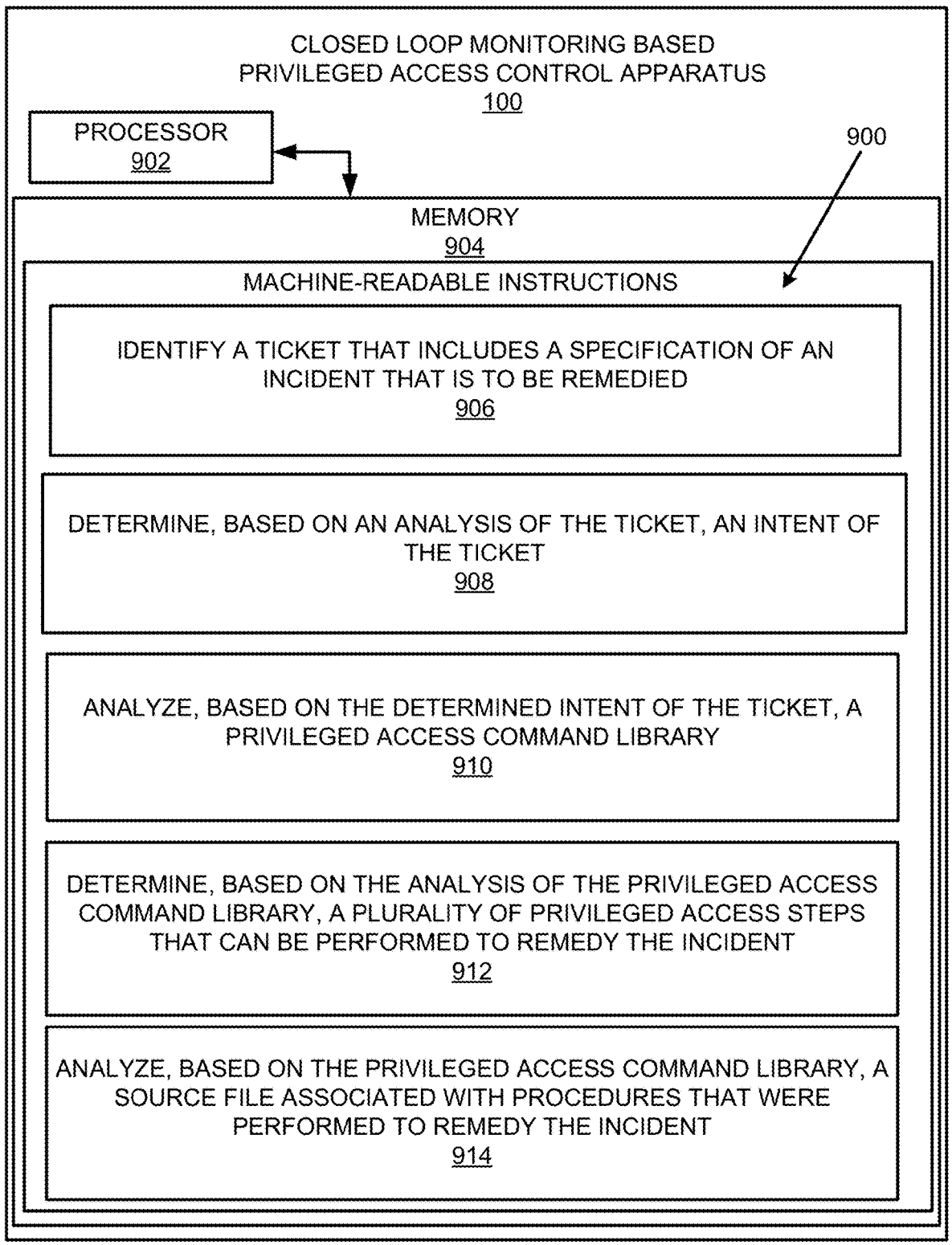
FIG. 9 illustrates an example block diagram for closed loop monitoring based privileged access control in accordance with an example of the present disclosure.
Figure 9:
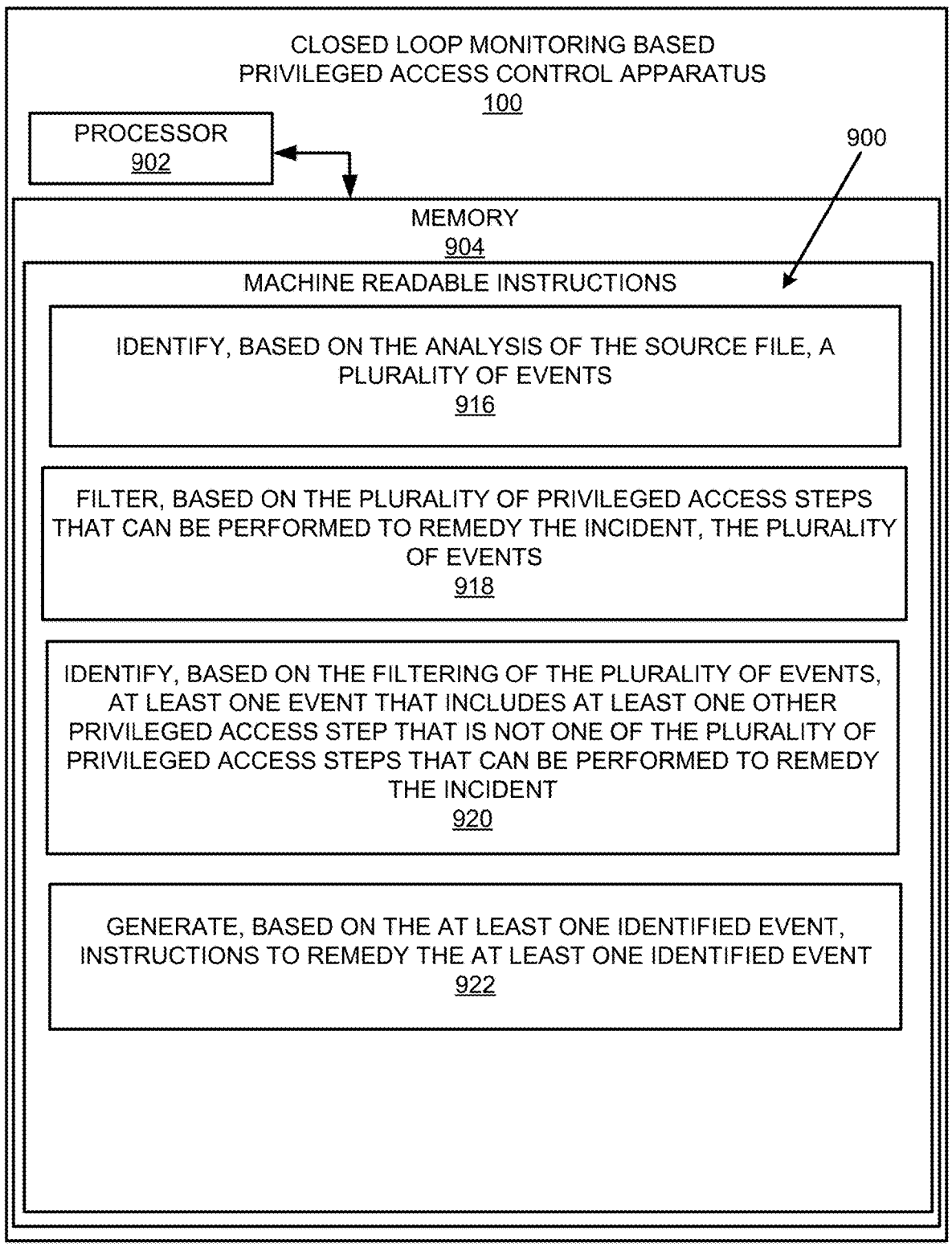
Figure 11:
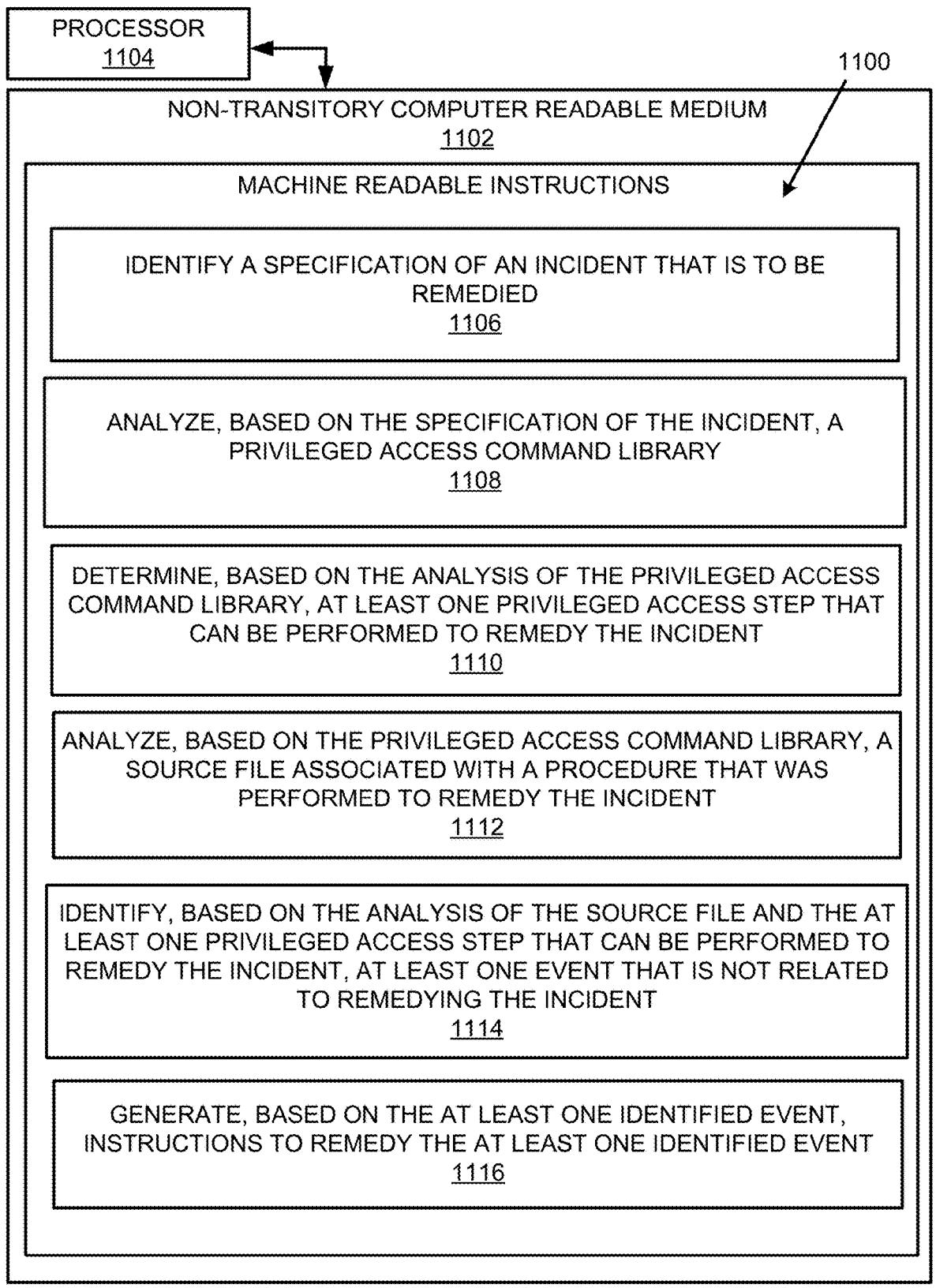
FIG. 11 illustrates a further example block diagram for closed loop monitoring based privileged access control in accordance with another example of the present disclosure.

FIGS. 9-11 respectively illustrate an example block diagram 900, a flowchart of an example method 1000, and a further example block diagram 1100 for closed loop monitoring based privileged access control, according to examples. The block diagram 900, the method 1000, and the block diagram 1100 may be implemented on the apparatus 100 described above with reference to FIG. 1 by way of example and not of limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine-readable instructions that when executed by the processor cause the processor to perform the instructions of the block diagram 900. The memory 904 may represent a non-transitory computer readable medium. FIG. 10 may represent an example method for closed loop monitoring based privileged access control, and the steps of the method. FIG. 11 may represent a non-transitory computer readable medium 1102 having stored thereon machine-readable instructions to provide closed loop monitoring based privileged access control according to an example. The machine-readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine-readable instructions and data for a processor may reside during runtime.

Referring to FIGS. 1-9, and particularly to the block diagram 900 shown in FIG. 9, the memory 904 may include instructions 906 to identify a ticket 104 that includes a specification of an incident 106 that is to be remedied.

The processor 902 may fetch, decode, and execute the instructions 908 to determine, based on an analysis of the ticket 104, an intent 108 of the ticket 104.

The processor 902 may fetch, decode, and execute the instructions 910 to analyze, based on the determined intent 108 of the ticket 104, a privileged access command library 110.

The processor 902 may fetch, decode, and execute the instructions 912 to determine, based on the analysis of the privileged access command library 110, a plurality of privileged access steps 112 that can be performed to remedy the incident 106.

The processor 902 may fetch, decode, and execute the instructions 914 to analyze, based on the privileged access command library 110, a source file 116 associated with procedures that were performed to remedy the incident 106.

The processor 902 may fetch, decode, and execute the instructions 916 to identify, based on the analysis of the source file 116, a plurality of events 118.

The processor 902 may fetch, decode, and execute the instructions 918 to filter, based on the plurality of privileged access steps 112 that can be performed to remedy the incident 106, the plurality of events 118.

The processor 902 may fetch, decode, and execute the instructions 920 to identify, based on the filtering of the plurality of events 118, at least one event 122 that includes at least one other privileged access step that is not one of the plurality of privileged access steps that can be performed to remedy the incident 106.

The processor 902 may fetch, decode, and execute the instructions 922 to generate, based on the at least one identified event 122, instructions 126 to remedy the at least one identified event 122.

Referring to FIGS. 1-7 and 10, and particularly FIG. 10, for the method 1000, at block 1002, the method may include identifying, by at least one hardware processor, a specification of an incident 106 that is to be remedied.

At block 1004, the method may include analyzing, by the at least one hardware processor, based on the specification of the incident 106, a privileged access command library 110.

At block 1006, the method may include determining, by the at least one hardware processor, based on the analysis of the privileged access command library 110, at least one privileged access step that can be performed to remedy the incident 106.

At block 1008, the method may include analyzing, by the at least one hardware processor, based on the privileged access command library 110, a source file 116 associated with a procedure that was performed to remedy the incident 106.

At block 1010, the method may include identifying, by the at least one hardware processor, based on the analysis of the source file 116, a plurality of events 118.

At block 1012, the method may include filtering, by the at least one hardware processor, based on the at least one privileged access step that can be performed to remedy the incident 106, the plurality of events 118.

At block 1014, the method may include identifying, by the at least one hardware processor, based on the filtering of the plurality of events 118, at least one event 122 that includes at least one further privileged access step that is not the at least one privileged access step that can be performed to remedy the incident 106.

At block 1016, the method may include generating, by the at least one hardware processor, based on the at least one identified event, instructions 126 to remedy the at least one identified event.

According to examples disclosed herein, for the method 1000, analyzing, by the at least one hardware processor, based on the specification of the incident 106, the privileged access command library 110 may further include determining, by the at least one hardware processor, based on an analysis of the specification of the incident 106, an intent 108 of the specification of the incident 106, and analyzing, by the at least one hardware processor, based on the intent 108 of the specification of the incident 106, the privileged access command library 110.

According to examples disclosed herein, for the method 1000, determining, by the at least one hardware processor, based on the analysis of the privileged access command library 110, the at least one privileged access step that can be performed to remedy the incident 106 may further include mapping, by the at least one hardware processor, the specification of the incident 106 to records of the privileged access command library 110 to determine the at least one privileged access step that can be performed to remedy the incident 106.

According to examples disclosed herein, for the method 1000, mapping, by the at least one hardware processor, the specification of the incident 106 to the records of the privileged access command library 110 to determine the at least one privileged access step that can be performed to remedy the incident 106 may further include mapping, by the at least one hardware processor, the specification of the incident 106 to an action and a signature of each record of the records of the privileged access command library 110 to determine the at least one privileged access step that can be performed to remedy the incident 106.

According to examples disclosed herein, for the method 1000, analyzing, by the at least one hardware processor, based on the privileged access command library 110, the source file 116 associated with the procedure that was performed to remedy the incident 106, may further include utilizing, by the at least one hardware processor, optical character recognition to analyze the video file, extracting, by the at least one hardware processor, based on the optical character recognition-based analysis of the video file, text from the video file, and matching, by the at least one hardware processor, the text from the video file to records of the privileged access command library 110 to identify the plurality of events 118.

According to examples disclosed herein, for the method 1000, identifying, by the at least one hardware processor, based on the analysis of the source file 116, the plurality of events 118 may further include identifying, by the at least one hardware processor, based on the analysis of the source file 116, the plurality of events 118 that include a privileged access-based command, and/or a privileged access-based action.

According to examples disclosed herein, for the method 1000, generating, by the at least one hardware processor, based on the at least one identified event, the instructions 126 to remedy the at least one identified event 122 may further include generating, by the at least one hardware processor, based on the at least one identified event, the instructions 126 to deny access to a system associated with the incident 106 to remedy the at least one identified event, and/or reduce access to the system associated with the incident 106 to remedy the at least one identified event.

According to examples disclosed herein, the method 1000 may further include determining, by the at least one hardware processor, whether the at least one identified event 122 requires performance of a procedure to remedy the at least one identified event. Further, based on a determination that the at least one identified event 122 does not require performance of the procedure to remedy the at least one identified event, the method 1000 may include updating, by the at least one hardware processor, the privileged access command library 110 to include the at least one identified event 122 as part of the at least one privileged access step that can be performed to remedy the incident 106.

Referring to FIGS. 1-7 and 11, and particularly FIG. 11, for the block diagram 1100, the non-transitory computer readable medium 1102 may include instructions 1106 to identify a specification of an incident 106 that is to be remedied.

The processor 1104 may fetch, decode, and execute the instructions 1108 to analyze, based on the specification of the incident 106, a privileged access command library 110.

The processor 1104 may fetch, decode, and execute the instructions 1110 to determine, based on the analysis of the privileged access command library 110, at least one privileged access step that can be performed to remedy the incident 106.

The processor 1104 may fetch, decode, and execute the instructions 1112 to analyze, based on the privileged access command library 110, a source file 116 associated with a procedure that was performed to remedy the incident 106.

The processor 1104 may fetch, decode, and execute the instructions 1114 to identify, based on the analysis of the source file 116 and the at least one privileged access step that can be performed to remedy the incident 106, at least one event 122 that is not related to remedying the incident 106.

The processor 1104 may fetch, decode, and execute the instructions 1116 to generate, based on the at least one identified event, instructions 126 to remedy the at least one identified event.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A closed loop monitoring based privileged access control apparatus comprising:
   a ticket intent analyzer, executed by at least one hardware processor, to
      identify a ticket that includes a specification of an incident that is to be remedied,
      determine, based on an analysis of the ticket, an intent of the ticket,
      analyze, based on the determined intent of the ticket, a privileged access command library, and
      determine, based on the analysis of the privileged access command library, a plurality of privileged access steps that can be performed to remedy the incident;
   a deep vision analyzer, executed by the at least one hardware processor, to analyze, based on the privileged access command library, a source file associated with procedures that were performed to remedy the incident, wherein the source file includes a video file, and identify, based on the analysis of the source file, a plurality of events;

an event filter, executed by the at least one hardware processor, to filter, based on the plurality of privileged access steps that can be performed to remedy the incident, the plurality of events, and identify, based on the filtering of the plurality of events, at least one event that includes at least one other privileged access step that is not one of the plurality of privileged access steps that can be performed to remedy the incident; and an event remediator, executed by the at least one hardware processor, to generate, based on the at least one identified event, instructions to remedy the at least one identified event.

2. The apparatus according to claim 1, wherein the ticket intent analyzer is executed by the at least one hardware processor to determine, based on the analysis of the ticket, the intent of the ticket by:

utilizing natural language processing to determine the intent of the ticket.

3. The apparatus according to claim 1, wherein the ticket intent analyzer is executed by the at least one hardware processor to determine, based on the analysis of the privileged access command library, the plurality of privileged access steps that can be performed to remedy the incident by:

mapping the determined intent of the ticket to records of the privileged access command library to determine the plurality of privileged access steps that can be performed to remedy the incident.

4. The apparatus according to claim 3, wherein the ticket intent analyzer is executed by the at least one hardware processor to map the determined intent of the ticket to the records of the privileged access command library to determine the plurality of privileged access steps that can be performed to remedy the incident by:

mapping the determined intent of the ticket to an action and a signature of each record of the records of the privileged access command library to determine the plurality of privileged access steps that can be performed to remedy the incident.

5. The apparatus according to claim 1, wherein the deep vision analyzer is executed by the at least one hardware processor to analyze, based on the privileged access command library, the source file associated with procedures that were performed to remedy the incident by:

utilizing optical character recognition to analyze the video file;

extracting, based on the optical character recognition-based analysis of the video file, text from the video file; and matching the text from the video file to records of the privileged access command library to identify the plurality of events.

6. The apparatus according to claim 1, wherein the deep vision analyzer is executed by the at least one hardware processor to identify, based on the analysis of the source file, the plurality of events that include at least one of:

a privileged access-based command, or a privileged access-based action.

7. The apparatus according to claim 1, wherein the event remediator is executed by the at least one hardware processor to generate, based on the at least one identified event, the instructions to at least one of:

deny access to a system associated with the incident to remedy the at least one identified event, or reduce access to the system associated with the incident to remedy the at least one identified event.

8. The apparatus according to claim 1, further comprising:

a privileged access command library controller, executed by the at least one hardware processor, to:

determine whether the at least one identified event requires performance of a procedure to remedy the at least one identified event; and based on a determination that the at least one identified event does not require performance of the procedure to remedy the at least one identified event, update the privileged access command library to include the at least one identified event as part of the plurality of privileged access steps that can be performed to remedy the incident.

9. A method for closed loop monitoring based privileged access control, the method comprising:

identifying, by at least one hardware processor, a specification of an incident that is to be remedied;

analyzing, by the at least one hardware processor, based on the specification of the incident, a privileged access command library;

determining, by the at least one hardware processor, based on the analysis of the privileged access command library, at least one privileged access step that can be performed to remedy the incident;

analyzing, by the at least one hardware processor, based on the privileged access command library, a source file associated with a procedure that was performed to remedy the incident, wherein the source file includes a video file;

identifying, by the at least one hardware processor, based on the analysis of the source file, a plurality of events;

filtering, by the at least one hardware processor, based on the at least one privileged access step that can be performed to remedy the incident, the plurality of events;

identifying, by the at least one hardware processor, based on the filtering of the plurality of events, at least one event that includes at least one further privileged access step that is not the at least one privileged access step that can be performed to remedy the incident; and generating, by the at least one hardware processor, based on the at least one identified event, instructions to remedy the at least one identified event.

10. The method according to claim 9, wherein analyzing, by the at least one hardware processor, based on the specification of the incident, the privileged access command library further comprises:

determining, by the at least one hardware processor, based on an analysis of the specification of the incident, an intent of the specification of the incident; and analyzing, by the at least one hardware processor, based on the intent of the specification of the incident, the privileged access command library.

11. The method according to claim 9, wherein determining, by the at least one hardware processor, based on the analysis of the privileged access command library, the at least one privileged access step that can be performed to remedy the incident further comprises:

mapping, by the at least one hardware processor, the specification of the incident to records of the privileged access command library to determine the at least one privileged access step that can be performed to remedy the incident.

12. The method according to claim 11, wherein mapping, by the at least one hardware processor, the specification of the incident to the records of the privileged access command library to determine the at least one privileged access step that can be performed to remedy the incident further comprises:
mapping, by the at least one hardware processor, the specification of the incident to an action and a signature of each record of the records of the privileged access command library to determine the at least one privileged access step that can be performed to remedy the incident.

13. The method according to claim 9, wherein analyzing, by the at least one hardware processor, based on the privileged access command library, the source file associated with the procedure that was performed to remedy the incident, further comprises:
utilizing, by the at least one hardware processor, optical character recognition to analyze the video file;
extracting, by the at least one hardware processor, based on the optical character recognition-based analysis of the video file, text from the video file; and
matching, by the at least one hardware processor, the text from the video file to records of the privileged access command library to identify the plurality of events.

14. The method according to claim 9, wherein identifying, by the at least one hardware processor, based on the analysis of the source file, the plurality of events further comprises:
identifying, by the at least one hardware processor, based on the analysis of the source file, the plurality of events that include at least one of:
a privileged access-based command, or
a privileged access-based action.

15. The method according to claim 9, wherein generating, by the at least one hardware processor, based on the at least one identified event, the instructions to remedy the at least one identified event further comprises:
generating, by the at least one hardware processor, based on the at least one identified event, the instructions to at least one of:
deny access to a system associated with the incident to remedy the at least one identified event, or
reduce access to the system associated with the incident to remedy the at least one identified event.

16. The method according to claim 9, further comprising:
determining, by the at least one hardware processor, whether the at least one identified event requires performance of a procedure to remedy the at least one identified event; and
based on a determination that the at least one identified event does not require performance of the procedure to remedy the at least one identified event, updating, by the at least one hardware processor, the privileged access command library to include the at least one identified event as part of the at least one privileged access step that can be performed to remedy the incident.

17. A non-transitory computer readable medium having stored thereon machine-readable instructions, the machine-readable instructions, when executed by at least one hardware processor, cause the at least one hardware processor to:
identify a specification of an incident that is to be remedied;
analyze, based on the specification of the incident, a privileged access command library;
determine, based on the analysis of the privileged access command library, at least one privileged access step that can be performed to remedy the incident;
analyze, based on the privileged access command library, a source file associated with a procedure that was performed to remedy the incident;
identify, based on the analysis of the source file and the at least one privileged access step that can be performed to remedy the incident, at least one event that is not related to remedying the incident; and
generate, based on the at least one identified event, instructions to remedy the at least one identified event.

18. The non-transitory computer readable medium according to claim 17, wherein the source file includes a video file.

19. The non-transitory computer readable medium according to claim 18, wherein the machine readable instructions to analyze, based on the privileged access command library, the source file associated with the procedure that was performed to remedy the incident, when executed by the at least one hardware processor, further cause the at least one hardware processor to:
utilize optical character recognition to analyze the video file;
extract, based on the optical character recognition-based analysis of the video file, text from the video file; and
match the text from the video file to records of the privileged access command library to identify the at least one event.

20. The non-transitory computer readable medium according to claim 17, wherein the machine readable instructions to identify, based on the analysis of the source file and the at least one privileged access step that can be performed to remedy the incident, the at least one event that is not related to remedying the incident, when executed by the at least one hardware processor, further cause the at least one hardware processor to:
identify, based on the analysis of the source file, a plurality of events;
filter, based on the at least one privileged access step that can be performed to remedy the incident, the plurality of events; and
identify, based on the filtering of the plurality of events, the at least one event that includes at least one further privileged access step that is not the at least one privileged access step that can be performed to remedy the incident.

* * * * *